United States Patent
Stacy et al.

(10) Patent No.: US 8,612,325 B2
(45) Date of Patent: Dec. 17, 2013

(54) AUTOMATIC AUTHENTICATION AND FUNDING METHOD

(71) Applicant: MoviePass, Inc., New York, NY (US)

(72) Inventors: Spikes Stacy, New York, NY (US); Hamet Watt, New York, NY (US)

(73) Assignee: MoviePass Inc., New York, NY (US)

( * ) Notice: Subject to any disclaimer, the term of this patent is extended or adjusted under 35 U.S.C. 154(b) by 0 days.

(21) Appl. No.: 13/654,835

(22) Filed: Oct. 18, 2012

(65) Prior Publication Data

US 2013/0311368 A1    Nov. 21, 2013

Related U.S. Application Data

(60) Provisional application No. 61/649,013, filed on May 18, 2012.

(51) Int. Cl.
  *G06Q 40/00* (2012.01)
(52) U.S. Cl.
  USPC .................................. 705/35; 705/39; 705/40
(58) Field of Classification Search
  USPC .............................................. 705/35, 39, 40
  See application file for complete search history.

(56) References Cited

U.S. PATENT DOCUMENTS

| | | | |
|---|---|---|---|
| 5,970,479 A | 10/1999 | Shepherd | |
| 6,912,510 B1 | 6/2005 | Shepherd | |
| 7,174,534 B2 | 2/2007 | Chong et al. | |
| 7,337,949 B2 | 3/2008 | Roth | |
| 8,380,177 B2 * | 2/2013 | Laracey | 455/414.1 |
| 2009/0187492 A1 | 7/2009 | Hammand | |
| 2010/0113072 A1 | 5/2010 | Gibson et al. | |
| 2010/0125737 A1 | 5/2010 | Kang | |
| 2011/0145049 A1 | 6/2011 | Hertel et al. | |
| 2011/0251892 A1 * | 10/2011 | Laracey | 705/14.51 |
| 2011/0313874 A1 | 12/2011 | Hardie et al. | |
| 2012/0016731 A1 * | 1/2012 | Smith et al. | 705/14.33 |
| 2012/0116959 A1 * | 5/2012 | Pitroda et al. | 705/39 |

OTHER PUBLICATIONS

Galster, Agent-base Online Event Ticket System: Oct. 15, 2005, University of Calgary.

* cited by examiner

*Primary Examiner* — Lalita M Hamilton
(74) *Attorney, Agent, or Firm* — Courtney IP Law; Barbara B. Courtney

(57) ABSTRACT

Embodiments of an automatic authentication and funding method include a location-based transaction method according to which an overseer partners with multiple providers of at least one of goods and services to sell the goods and services to authorized users of a payment device. A controller entity defines and identifies an authorized user, and the controller agrees to fund predefined purchases on behalf of the authorized user, and further agrees to fund a user account for the purchases. The overseer receives user data and provider data from the controller, and generates a payment device for the user. The overseer uses at least one location-based mechanism to place funds on the payment device from the user account under predefined circumstances such that the user is enabled to make the predefined purchases from the approved providers.

17 Claims, 5 Drawing Sheets

AUTOMATIC AUTHENTICATION AND FUNDING METHOD

RELATED APPLICATIONS

This application claims the benefit of U.S. Provisional Patent Application No. 61/649,013 filed May 18, 2012, which is incorporated by reference herein in its entirety. This application is also related to U.S. patent application Ser. No. 13/654,263, filed Oct. 17, 2012, which is also incorporated by reference herein in its entirety.

BACKGROUND

Electronic transactions of all kinds have become quite common all over the world. Buyers of goods and services of all types have increasingly come to expect a convenient online way to do business. There are basic security concerns with electronic transactions, such as verifying that the person using funds is authorized to use the funds. For most transactions, existing methods and systems do a fair job of maintaining security. As an example, credit card transactions are extremely common for both in-person and online purchases. For online purchases the user must enter information such as the billing address of the card and the security code of the card. For in-person purchases, the seller can ask for some form of user identification if he or she wishes, but often no identification is requested. It is common for people to let others they trust use their payment devices (such as credit cards). There is no problem with this as long as the use is truly authorized. There may be instances, however, when a person such as a parent may want their child to have a payment device for limited uses. In other instances, it may be desirable for an entity or agency to issue a payment device to an individual for limited uses. It would be desirable to have a method for an entity or individual to give a person a means of making specific permitted purchases, while preventing the person from making specific disallowed purchases, and do this in a way that assures to a great degree of certainty that the purchaser is the intended person and not someone else.

DETAILED DESCRIPTION

Embodiments of a method and system for automatic authentication and funding are described. Embodiments enable a controller entity to give a user access to funds for authorized purchases. Authorized purchases are of particular selected goods and/or services purchased from particular selected merchants. Authorized purchases are at controlled by the controller entity. The user makes the authorized purchases subject to the controller's terms. The user is given a payment device or token to use for all authorized purchases. The user's identity in the course of purchases is authenticated by associating the user's identity with possession of the user's own mobile communication device (e.g., mobile phone), along with the location of the mobile device at a selected merchant. An overseer entity sets up and manages a user account on behalf of the controller entity. The overseer enlists merchants of goods and services of all types to participate in the methods described. The overseer offers the controller a wide variety of customizable options for controlling purchases.

Figure 1:
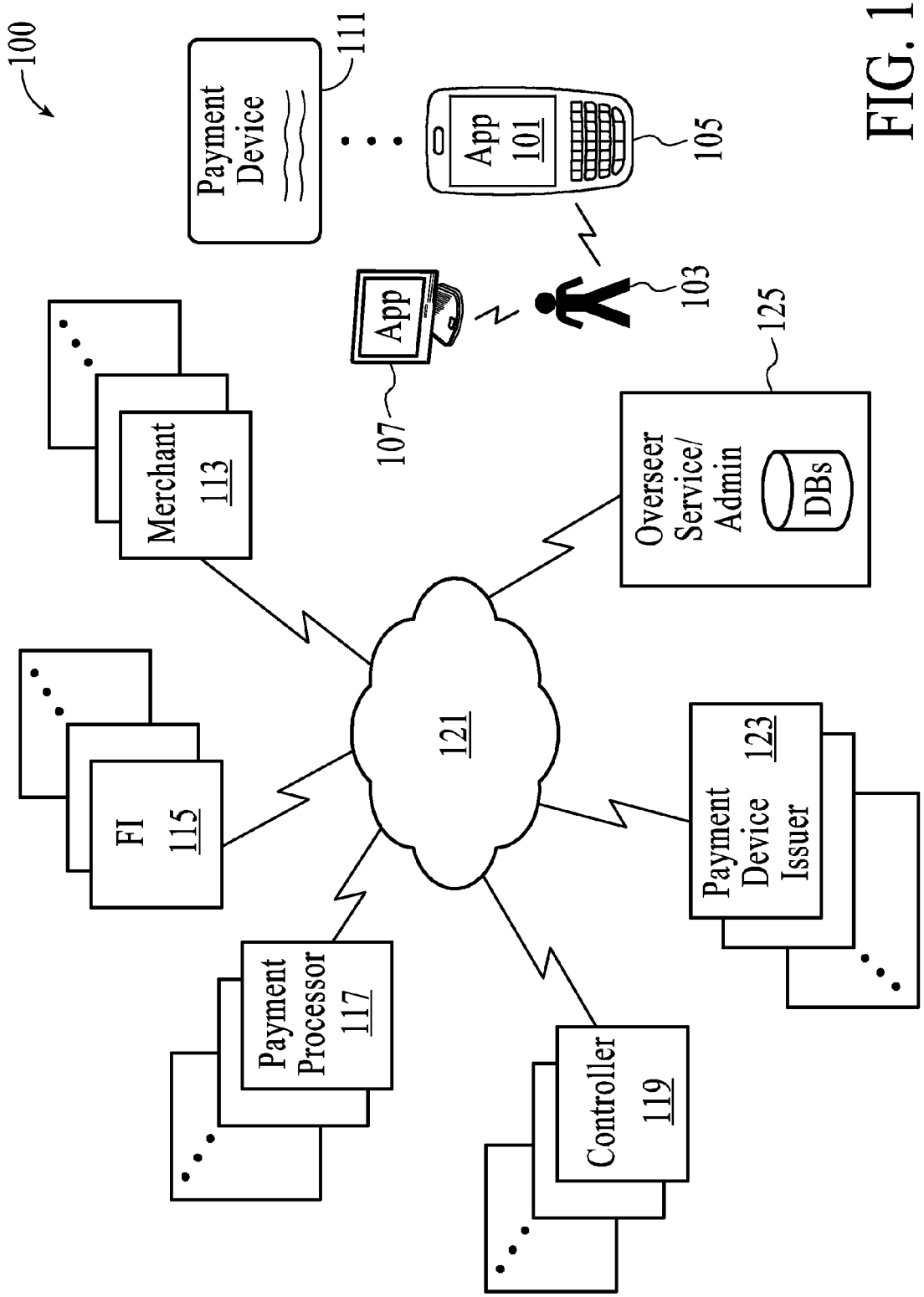
FIG. 1 is a block diagram of an automatic authentication and funding system capable of performing the methods described, according to an embodiment.

FIG. 1 is a block diagram of an automatic authentication and funding system 100 capable of performing the methods described, according to an embodiment. An overseer service/administration facility 125 includes hardware and software referred to herein as the "service" that performs and facilitates the described methods. The facility 125 includes databases to store user information, controller information, and any other information collected or used in practicing the methods described. While facility 125 is shown here as having one discrete location, it is typically a distributed facility with hardware and/or software in an unlimited number of locations, all in communication with one or more networks, including the Internet 121. Controller entities 119 can be any organization, group of people or individual person wishing to make funds available on a controlled basis to another organization, group of people or individual person. The example of a controller making funds available to an individual person is used to describe example embodiments herein, but the invention is not so limited. The controller can be a health insurer entity or government entity funding health care costs for users. The controller can be a government entity funding a program such as a food stamp program. The controller can be a company funding approved purchases made by employees. The controller can be a parent funding approved purchases made by a child. In the example of a government entity funding a food stamp program, individuals qualifying for the food stamp program (such as individual user 103) receive a payment device or token 111 for use at merchants 113. The user 103 is associated with a mobile communication device 105, typically a mobile phone that has a global positioning system (GPS) capability. It has been demonstrated that individuals very rarely go anywhere without their mobile phones or a mobile device with similar capabilities. In addition, users almost never lend their mobile devices to other people, even for short periods of time. For this reason, according to an embodiment, the location of the mobile device 105 authenticates the location and the identity of the user 103. In this way, the user cannot sell or trade the funds or the ability to use the funds granted to the user by the controller. The mobile device 105 runs an application (app) 101 as further described herein. The app 101 allows the user to use the service to make purchases with the payment devise 111 and to see information regarding the user account with the controller 119. In the food stamp example, the app shows the user when funds are available on the payment device 111 for authorized purchases. The app can also show the user the total funds used, the funds remaining per time period, etc. The user can also sign up for an account with the controller and access account information using a service app on a personal computer 107.

Merchants 113 are approved providers of goods and/or services. In an embodiment, the service enlists merchants to accept payment using the payment device, and provides a list of such merchants to the controller. The controller can designate merchants from the list for certain users. In addition, the controller can request that certain merchants be added to the list.

In an embodiment, the payment device is a reloadable, pre-paid card as known in the art and is supplied by many banks and credit card companies, such as VISA™, MasterCard'™, AMEX™, Discover™, and more. In an embodiment, overseer service 125 orders cards on behalf of controllers from payment device issuers 123. However, the device can be any item carrying electronic data that can be read by a reader at a merchant, where the reader can identify account information and convey it to a payment processor 117 so as to effect a funds transfer from the user account to a merchant account at a financial institution 115.

Figure 2:
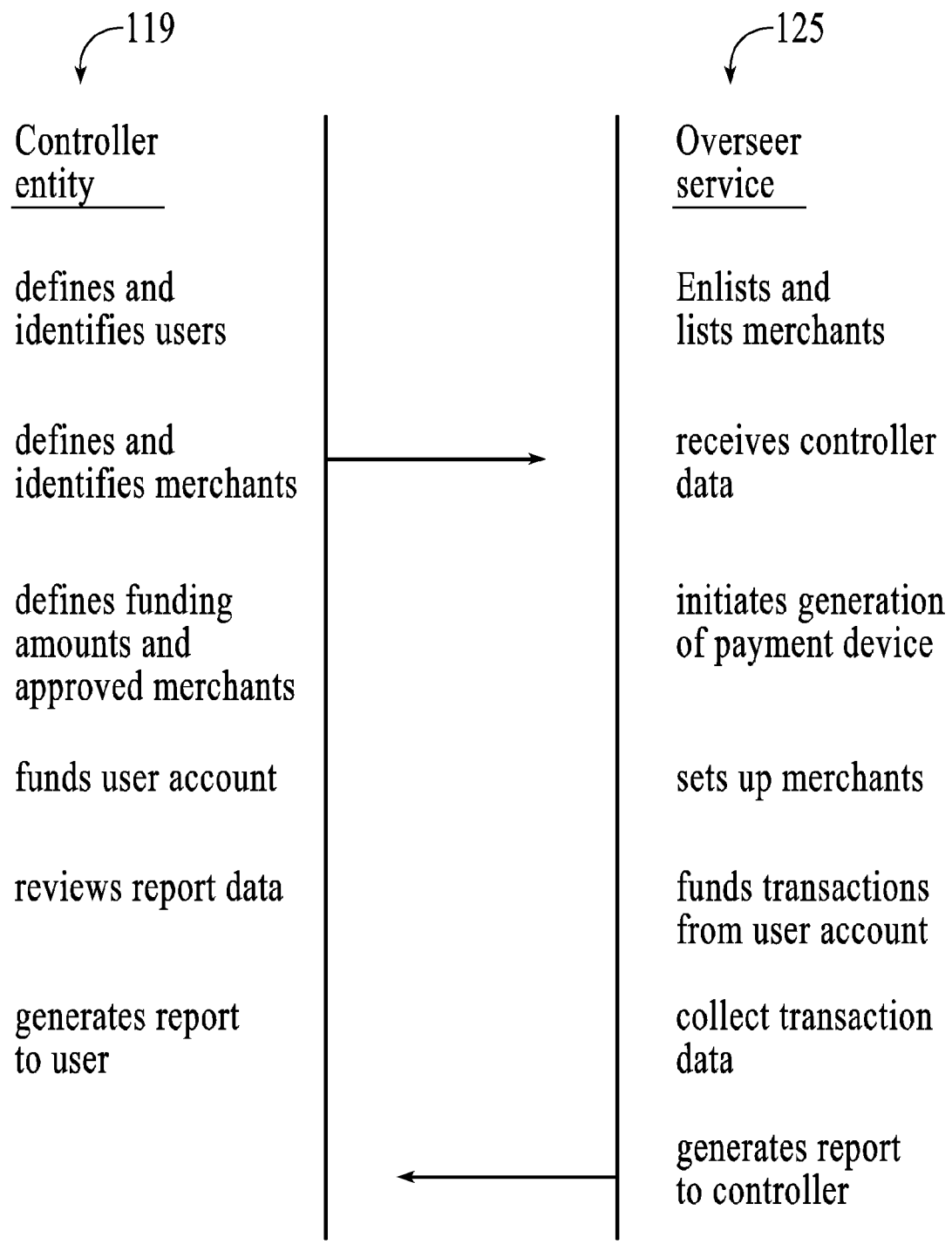
FIG. 2 is a diagram illustrating various functions and roles of controller entity and overseer, as well as ways in which the two interact with each other according to an embodiment.

FIG. 2 is a diagram illustrating various functions and roles of controller entity 119 and overseer 125, as well as ways in which the two interact with each other. Controller entity 119 defines and identifies users that it will fund purchases for. These definitions and identification are sent to the overseer service 125. The overseer service 125 enlists merchants to participate in the service and provides lists of participating merchants to the controller entity 119. In some instances, the controller entity can request that certain merchants or types of merchants be enlisted by the overseer service 125. Once users have been defined and identified, the controller entity defines funding amounts and approved merchants for each user or class of user.

The overseer service 125 initiates generation of a payment device for each defined user. In an embodiment, the payment device is a reloadable credit or debit card issued by a payment device issuer 123. The overseer service 125 sets up merchants as necessary to expect purchases from users using the payment device. In some instances, the merchant can use their existing electronic payment capabilities. In other instances, a dedicated terminal may be provided to the merchant. Any existing electronic payment infrastructures can be used.

The controller entity 119 funds the user account according to any terms or conditions defined by the controller. For example, there might be a certain amount of funds available per time period for authorized purchases. When the user is physically present with the mobile device at an approved merchant location, the user checks in to the service using the mobile device. At that time, the service 125 funds the contemplated transaction by placing fund on the payment device from the user account. The amount of funds is predefined by the controller 119. The amount of funds may be dependent on geographic location (merchant) or day of the week, or any other constraint. Daily reports of completed purchase transactions are collected by the overseer service 125 and used to generate a report to the overseer 119. The overseer 119 can review the report and detect any unintended use of the funds. The following further information is collected in an embodiment: merchant category classification (MCC codes); terminal IDs; and merchant IDs.

An MCC is a four digit numerical code assigned to merchants by card providers such as VISA™ and MasterCard™. The MCC for a transaction can be used to verify that the transaction was at a restaurant or a theater, for example. In an embodiment, use of the card can be restricted to certain MCCs. The card can also be restricted to certain terminal IDs. In an embodiment, use of the card for any purchase other than an approved purchase is a violation of the controller's terms. A variety of reactions to misuse of the card are possible. One, two or three instances of misuse can result in the member being warned, or the card being suspended or canceled.

The controller 119 also generates a report for the user so that the user can review the purchases and funds available. In some instances, the controller 119 requests that the overseer 125 perform this function on its behalf.

Figure 3:
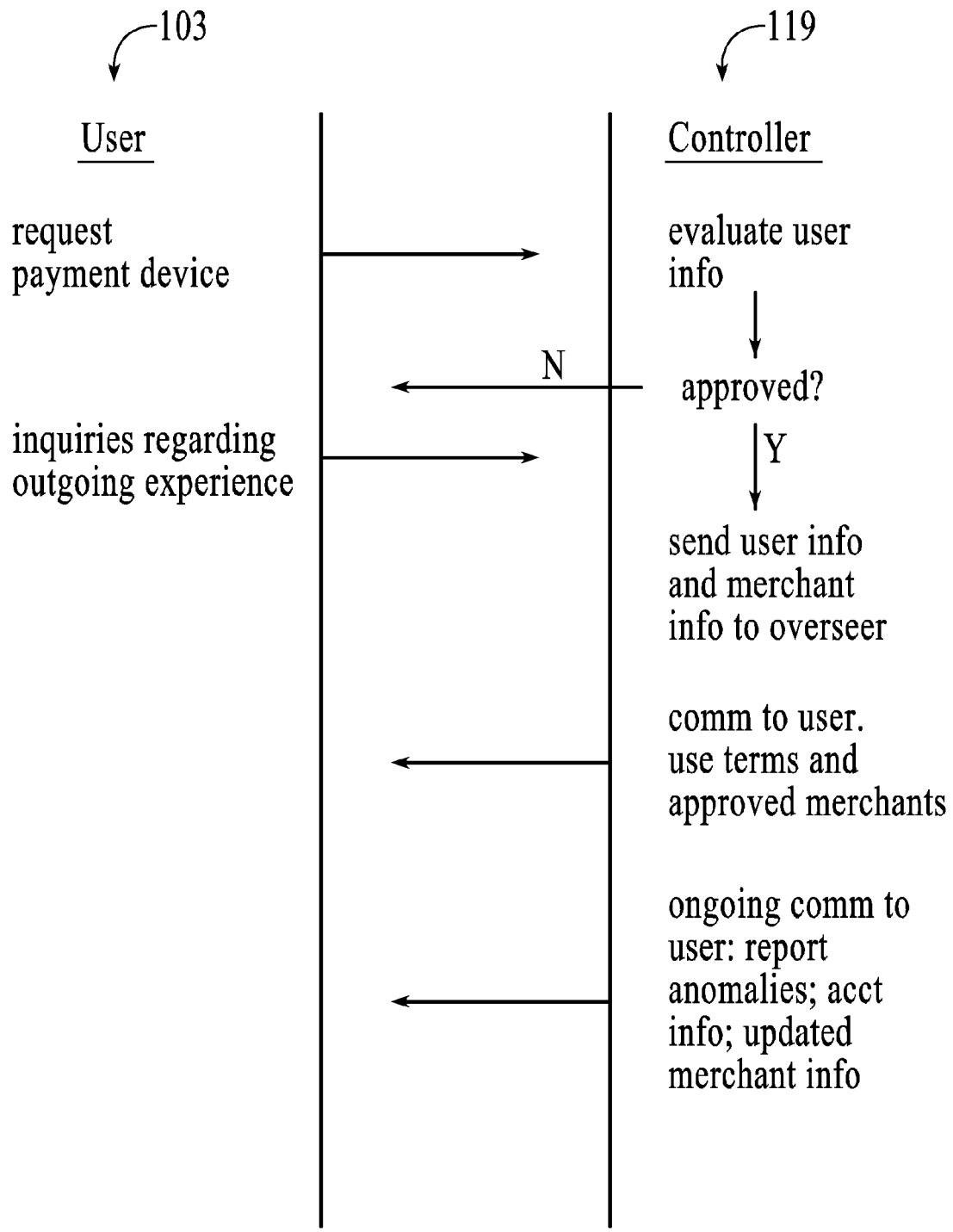
FIG. 3 is a diagram illustrating various functions and roles of controller entity and user, as well as ways in which the two interact with each other according to an embodiment.

FIG. 3 is a diagram illustrating various functions and roles of controller entity 119 and user 103, as well as ways in which the two interact with each other. The user 103 initiates the relationship with the controller 119 by requesting a payment device. The user 103 sends user information to the controller 119, which is evaluated by the controller 119. The controller 119 approves or disapproves the request. When a user 103 is approved, the controller 119 sends all of the user information to the overseer service 125. Merchant information pertaining to the particular user 103 is also sent to the overseer service 125. Merchant information identifies permitted merchants for user purchases under the terms of the controller-user relationship. The controller 119 sends the user 103 all of the agreed upon use terms for the funds to be supplied on behalf of user 103, and a list of approved merchants. The controller 119 communicates with the user 103 on an ongoing basis to provide the previously mentioned purchase and funds reports, to notify the user of any anomalous purchases, to provide updated merchant list, etc. The user 103 also has access to the controller for ongoing comments or inquiries about the user experience. In an embodiment, the communication between the user 103 and the controller 119 is through the same mobile app user interface provided by the overseer service 125 that is used for purchases by the user 103.

Figure 4:
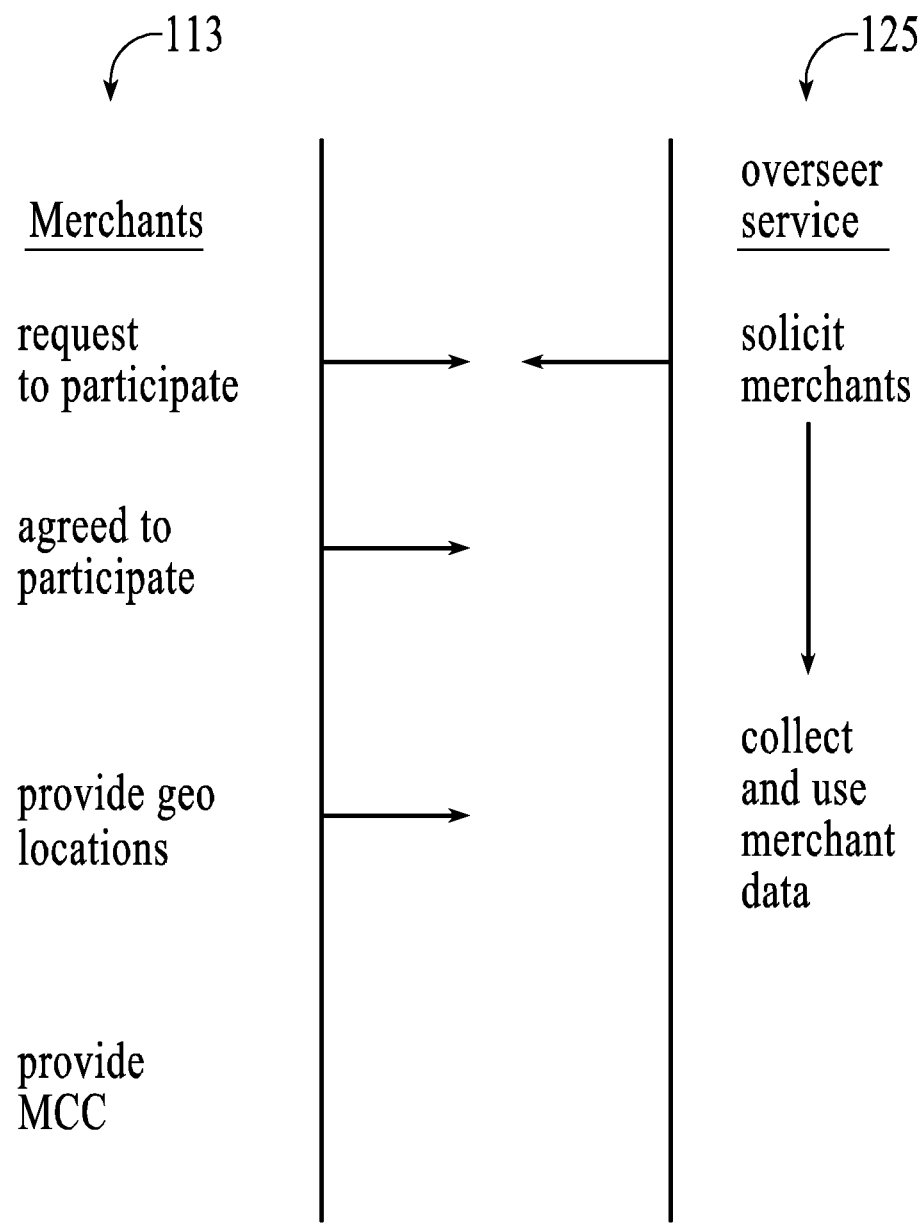
FIG. 4 is a diagram illustrating various functions and roles of the overseer service and merchants, as well as ways in which the two interact with each other according to an embodiment.

FIG. 4 is a diagram illustrating various functions and roles of the overseer service 125 and merchants 113, as well as ways in which the two interact with each other. Merchants 113 may request to participate in the service as described herein. Alternatively, overseer service 125 may solicit merchants to participate. Merchants who agree to participate provide the overseer service 125 with geographical locations, and in some instances, MCC codes and terminal IDs. The overseer service 125 collects and uses this merchant data to both provide a list of merchants to controller entities 119, and to administer the service.

Figure 5:
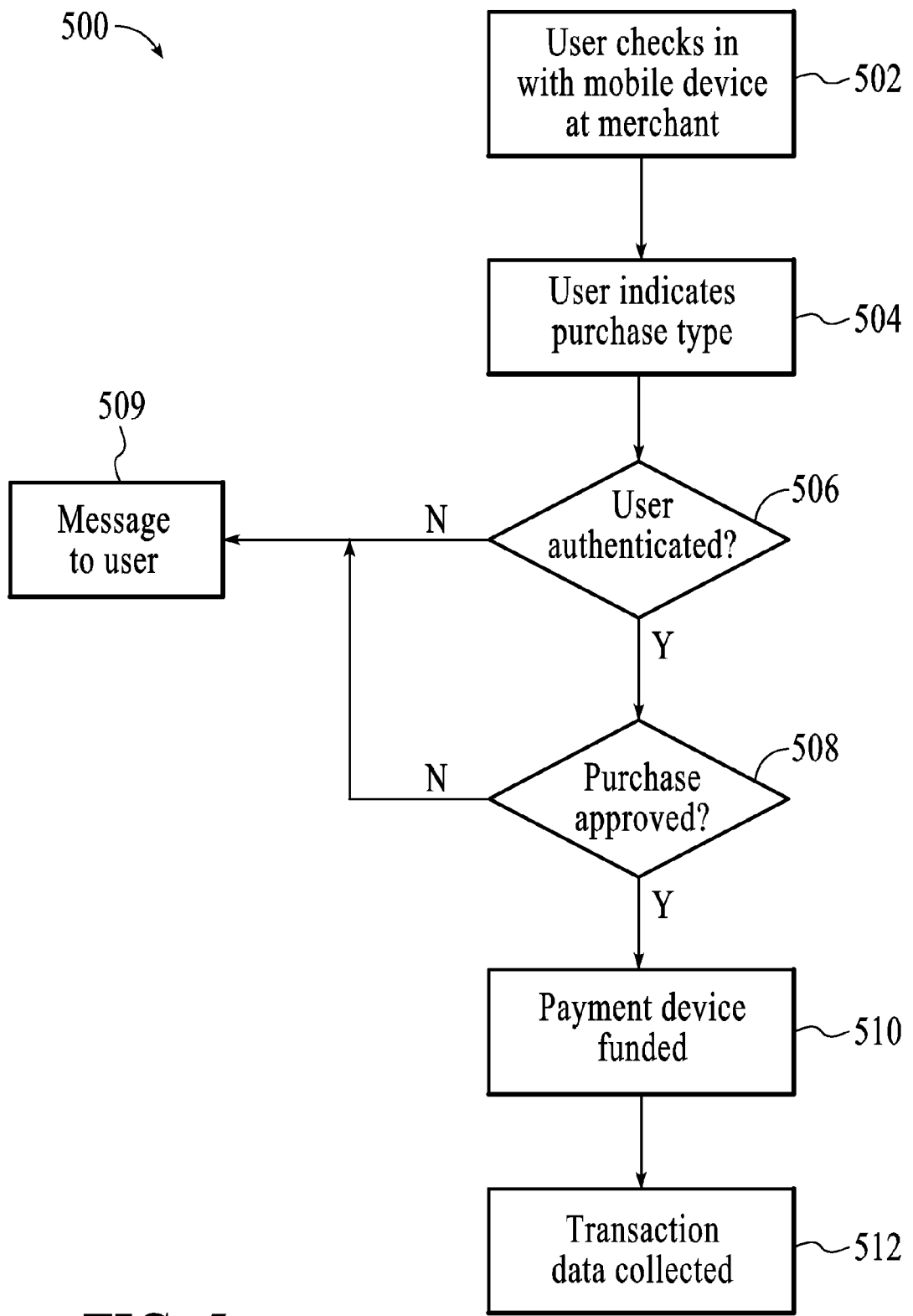
FIG. 5 is a flow diagram illustrating an example of a user purchase transaction process according to an embodiment.

FIG. 5 is a flow diagram illustrating an example of a user purchase transaction process 500 according to an embodiment. The user wishing to make a purchase uses a mobile app on the user's mobile device to check in (502) to the service once the user is actually at the merchant's location. In some embodiments, the user can indicate (504) a type of purchase from a possible group of types. In such embodiments, the type of purchase affects the permitted merchants (locations) for the purchase. The user is authenticated at 506 based upon the presence of the user at the expected location. In addition, the purchase can be approved or disapproved 508 based on whether the type of purchase matches the location as required by the user's terms with the controller entity. If the user is not authenticated or the purchase is not approved, a message is displayed to the user on the mobile device (509). From the message, the user has an opportunity to determine that he or she is not in the correct location for the purchase, there are not sufficient funds available, or some other reason for failure.

If the user is authenticated and the purchase is approved, the device is instantly funded for a predetermined amount based on the requirements specified to the overseer by the controller. After the transaction is complete, transaction data is collected for reporting at 512. In an embodiment, transaction data is automatically collected after a predetermined period of time, for example two hours or one day.

The example mobile device user interface as shown and described in copending U.S. patent application Ser. No. 13/654,263, filed Oct. 17, 2012 (which is incorporated by reference herein in its entirety) can be used for the methods described herein, but is not a limiting example.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A computer-implemented location-based transaction management method, comprising:

receiving, by an overseer service/administration facility processor, a request from a controller entity processor to manage transactions on behalf of the controller entity, wherein the controller entity comprises an entity that wishes to control purchase transactions of users with which the controller entity has a relationship, wherein the request comprises a list of merchant partners and associated locations of the merchant partners, information regarding a user with which the controller entity has a relationship, and purchase restrictions, wherein receiving comprises the controller processor communicating with the overseer processor via a network;

in response to the request, the overseer processor generating a payment token for the user on behalf of the controller entity;

the overseer processor receiving a purchase request from the user via a user electronic communication device when the user wishes to make a purchase according to terms of the relationship;

in response to the request, the overseer processor,
determining a location of the user comprising determining a location of a user mobile communication device; and
funding the purchase request if the location matches one of the associated locations of the merchant partners based on information related to the purchase request.

2. The method of claim 1, further comprising the overseer processor verifying the merchant based on the location of the mobile device.

3. The method of claim 1 wherein funding the purchase request further comprises determining a funding amount based on at least one of the merchant who will be selling the purchase, the type of the purchase as indicated by the user, and a preapproval from the controller entity.

4. The method of claim 1, further comprising:
the overseer processor creating at least one account for the user based on the request from the controller entity; and the overseer processor receiving funds for deposit in the user account from the controller entity.

5. The method of claim 4 wherein placing funds on the payment device comprises the overseer processor authorizing a transfer of funds from the user account to the payment device.

6. The method of claim 1, further comprising the overseer processor collecting data on purchase transactions the user makes using the payment device, including at least an identity of the merchant, an identity of the thing purchased, wherein the thing purchased comprises a good or a service, a time of the purchase, a dollar amount of the purchase, and a geographical location of the purchase.

7. The method of claim 6, further comprising:
the overseer processor using the collected data to compile a user report related to the user; and
the overseer processor transmitting the user report to the controller entity via the network.

8. The method of claim 1 wherein merchant partners comprise sellers of one or more of goods and services, wherein merchant partners identify all geographical locations at which they sell, and wherein merchant partners agree to accept payment for at least one of goods and services by the payment token.

9. The method of claim 1, wherein the payment token comprises at least one of a credit card and a debit card.

10. The method of claim 1, wherein the controlling entity comprises at least one of a government agency, an individual person, a corporation, and a non-profit institution.

11. The computer-implemented method of claim 1, wherein funding comprises communicating via a network to cause funds to be placed on the payment device.

12. A location-based transaction system, comprising:
a controller entity comprising at least one processor and software coupled to at least one network, wherein the controller software comprises instructions executable on the at least one controller processor to perform a controller method comprising,
defining and identifying an authorized user, wherein the controller is configurable to fund predefined purchases on behalf of the authorized user, and to fund a user account for the purchases; and
choosing at least one of a plurality of predefined approved providers for purchases made by the authorized user; and
an overseer entity comprising at least one overseer processor and software coupled to the at least one network, the overseer software comprising instructions executable on the at least one overseer processor to perform an overseer method comprising,
receiving user data and provider data from the controller entity, and generating a payment device for the user; and
using at least one location-based mechanism to place funds on the payment device from the user account under predefined circumstances such that the user is enabled to make the predefined purchases from the approved providers, wherein the predefined circumstances comprise a user's mobile device being detected at a physical location of an approved provider.

13. The method of claim 12, wherein the predefined circumstances comprise sufficient funds existing in the user account.

14. The method of claim 12, wherein the controller entity is associated with at least one of an individual, an organization, a corporation, and a government entity.

15. The method of claim 12, wherein the user comprises at least one of an individual, an individual member of an organization, and an employee of a corporation.

16. The method of claim 12, wherein the controller method further comprises collecting data related to purchase transactions and using the data to generate a report.

17. The method of claim 12, wherein the payment device is a reloadable credit card.

* * * * *